United States Patent [19]
Wailes

[11] 3,782,168
[45] Jan. 1, 1974

[54] METHOD AND APPARATUS FOR CALIBRATING AND TESTING PRESSURE RESPONSIVE APPARATUS

[75] Inventor: Rodney A. Wailes, Houston, Tex.

[73] Assignee: M & J Valve Company, Houston, Tex.

[22] Filed: Oct. 2, 1972

[21] Appl. No.: 294,349

[52] U.S. Cl. ................................. 73/4 R
[51] Int. Cl. ........................................ G01l 27/00
[58] Field of Search ............................ 73/1 R, 4 R; 340/214, 410, 411

[56] References Cited
UNITED STATES PATENTS

| | | |
|---|---|---|
| 3,106,084 | 10/1963 | Hoffman et al. .................... 73/4 R |
| 3,576,412 | 4/1971 | Jullien-Darin ..................... 340/410 |

*Primary Examiner*—S. Clement Swisher
*Attorney*—Paul D. Flehr et al.

[57] ABSTRACT

Method and apparatus for generating a gas pressure signal for calibrating and testing line break controls and other pressure responsive apparatus. Gas is confined in a chamber and expanded by increasing the volume of the chamber at a substantially constant rate under the control of hydraulic means. The pressure of the gas drops at a substantially constant rate determined by the setting of the hydraulic means.

8 Claims, 1 Drawing Figure

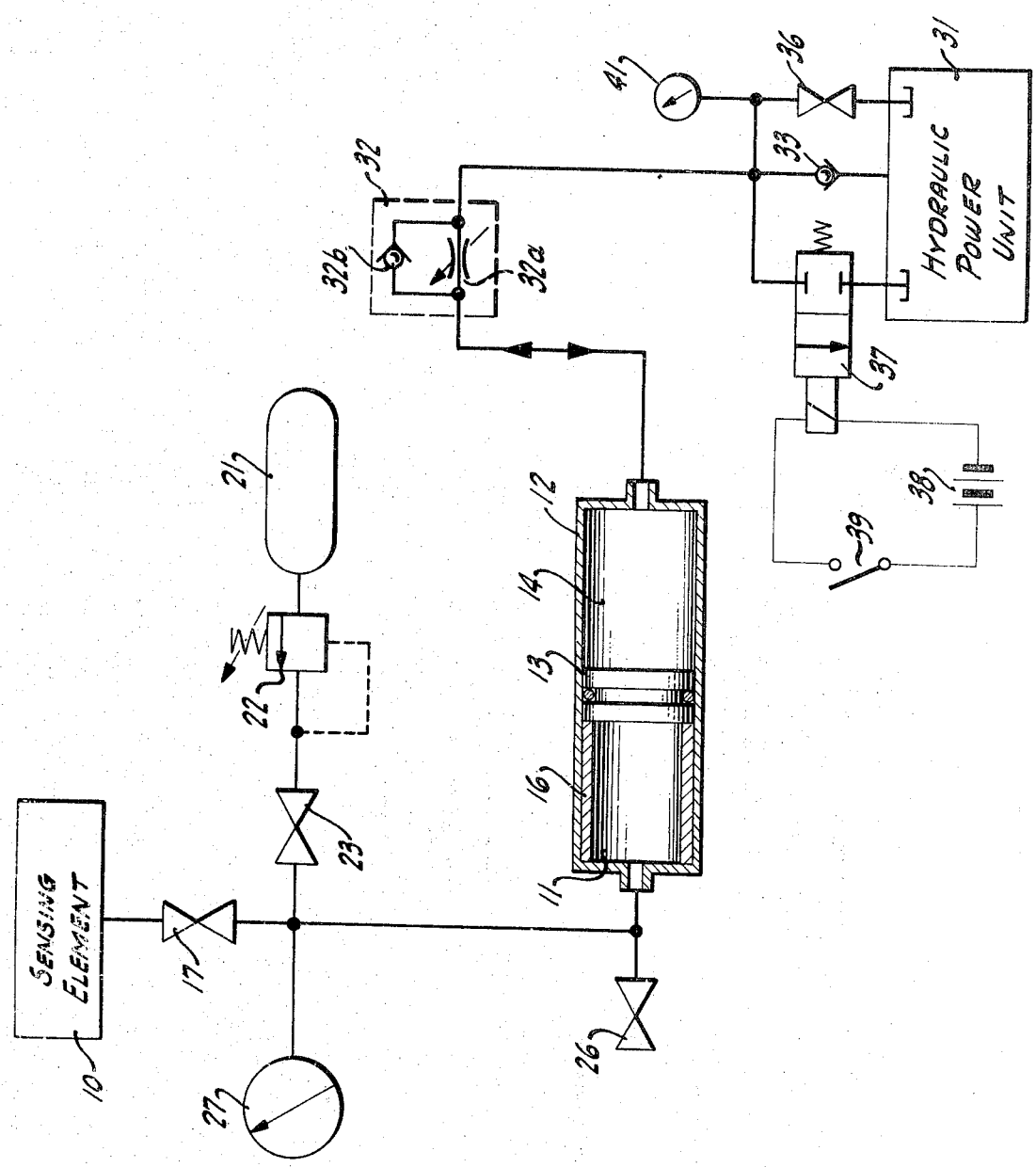

METHOD AND APPARATUS FOR CALIBRATING AND TESTING PRESSURE RESPONSIVE APPARATUS

BACKGROUND OF THE INVENTION

This invention pertains generally to pipelines and line condition responsive equipment and more particularly to a method and apparatus for calibrating and testing such equipment.

Various types of line condition responsive equipment are currently used on pipelines. For example, in pipelines such as are used to convey natural gas or other petroleum products, line break controls have been provided for automatically closing one or more line valves in the event of a rapid drop in pressure due to a break in the line. Both mechanical and electrical line break controls are in use today. In the mechanical devices, the pressure in the line is generally compared with the pressure in a reference tank, while in the electrical systems the line pressure is converted to an electrical signal which is then electrically or electronically compared with a reference signal. Both types of systems must be calibrated and tested to assure proper operation in response to a predetermined rate of pressure drop.

Heretofore, line break controls have been calibrated and tested pneumatically with gas taken either from the pipeline itself or from a reference tank. The control is connected to the line or tank, and gas is vented to the atmosphere through a metering valve to provide a drop in pressure. This technique is unsatisfactory in several respects. Gas metering valves are not accurate enough to provide uniform or repeatable rates of drop, and consequently an average rate for each run must be calculated from the initial and final pressures and the time of the run. A number of runs may be required before the desired rate is achieved. This technique is time-consuming and costly, and it results in the discharge of large quantities of gas to the atmosphere. Moreover, it is inaccurate in that relatively small changes in pressure, e.g. 10 psi, cannot be read accurately on guages designed for line pressures on the order of 1,000 psi.

There is, therefore, a need for a new and improved method and apparatus for generating a gas pressure signal for calibrating and testing line break controls and other apparatus responsive to drops in pressure.

SUMMARY AND OBJECTS OF THE INVENTION

The invention provides a method and apparatus for generating a gas signal which decreases in pressure at a rate determined by hydraulic means. The sensing element of the break control or other equipment to be calibrated or tested is connected in communication with a chamber having hydraulically operated means for controlling the volume thereof. The chamber is set to a predetermined initial volume by supplying fluid under pressure to the hydraulically operated means, and then gas under pressure is introduced into the chamber. Thereafter, fluid is discharged from the hydraulically operated means at a predetermined rate to increase the volume of the chamber and provide a desired rate of pressure drop in the gas. The rate of fluid discharge, and hence the rate of gas pressure drop, is controlled by a hydraulic flow control device which can be accurately set to provide the desired rate of pressure drop.

It is in general an object of the invention to provide a new and improved method and apparatus for generating a gas pressure signal for calibrating and testing line break controls and other apparatus responsive to changes in gas pressure.

Another object of the invention is to provide a method and apparatus of the above character which provides a more accurate rate of pressure drop than the techniques heretofore provided.

Another object of the invention is to provide a method and apparatus of the above character in which the pressure of the gas is caused to decrease at a rate which is controlled hydraulically.

Additional objects and features of the invention will be apparent from the following description in which the preferred embodiments are set forth in detail in conjunction with the accompanying drawing.

BRIEF DESCRIPTION OF THE DRAWING

The drawing is a schematic diagram of one embodiment of apparatus incorporating the invention.

DESCRIPTION OF THE PREFERRED EMBODIMENTS

In the drawing, the invention is illustrated in connection with the line break control means having a sensing element 10 for monitoring the pressure in a pipeline. The break control means can, for example, be an electronic system such as described in U.S. Pat. No. 3,665,945, issued May 30, 1972 to the assignee herein. It will be understood, however, that the invention can be used with other types of break controls and other types of pressure responsive apparatus as well. In one electronic break control currently manufactured by the assignee, the sensing element is a pressure transducer having a Bourdon tube connected to a variable resistor to provide an electrical output signal proportional to pressure input. In a mechanical break control, the pressure sensor may simply be an orifice, in which case the invention would be connected to the line side of the orifice. Similarly, with other types of sensing elements, the invention would be connected to the input to which the line is normally connected. As shown in U.S. Pat. No. 3,665,945 a signal generated by the control means can be employed to control power generation of a line valve.

The invention includes a chamber of variable volume 11 and hydraulically operated means for varying the volume of the chamber. In one presently preferred embodiment, the chamber is provided by a piston-type jydro-pneumatic accumulator which includes a cylindrical shell 12 and a free-moving piston 13 slidably mounted therein. The piston divides the cylinder into a gas chamber 11 and a fluid chamber 14, and it is sealed by suitable means such as resilient O-ring as indicated. These chambers are closed, and they vary in volume reciprocally of each other. Stop means such as an annular sleeve 16 is disposed axially of chamber 11 to limit the travel of piston 13 and establish a minimum volume for chamber 11.

In place of a sealed moveable piston for separating the two chambers, a moveable diaphragm of flexible material can be employed, provided that the diaphragm has adequate free movement and is limited in its movement in one direction.

Sensing element 10 is connected in communication with chamber 11 through a valve 17 which is moveable between open and closed positions for controlling communication between the element and the chamber.

Means is provided for introducing gas under pressure into chamber 11. This means includes a pressurized tank 21 of a suitable test gas such as nitrogen. The tank is connected in communication with chamber 11 through a pressure reducing regulator 22 and a valve 23 which is moveable between open and closed positions for controlling communication between the tank and chamber. Alternatively, if desired, gas can be taken from another source, such as the pipeline to which sensing element 10 is normally connected, in which case tank 21 can be omitted.

A bleed valve 26 moveable between open and closed positions is connected in communication with chamber 11 and provides means for bleeding gas from the chamber to the atmosphere. A pressure guage 27 is provided for indicating gas pressure in chamber 11.

Hydraulic fluid under pressure is supplied to chamber 14 from a hydraulic power unit 31. This unit can be of conventional design, such as hand-operated pump or a motor-driven pump.

Flow control means 32 is provided for effecting discharge of fluid from chamber 14 at a predetermined flow rate. This includes a flow control orifice 32a which is connected between the chamber 14 and the hydraulic power unit 31. Check valves 32b and 33 are connected across orifice 32a and between the output of the power unit and the control to permit fluid to pass freely from the power unit to chamber 14. Fluid flowing from chamber 14 back to the power unit passes through orifice 32a. This orifice is variable and can be set to provide a desired rate of flow. A particularly suitable flow control valve for use as flow control means 32 is available from the Manatrol division of Parker Hannifen, Elyria, Ohio, and designated as the TPCCSL series. This control valve is both temperature and pressure compensated, and for a particular setting it provides a substantially constant flow rate over wide temperature and pressure ranges.

Means is provided for controlling the flow of fluid from the flow control valve to the power unit. This means includes a manually operable valve 36 and a solenoid-operated valve 37 connected in parallel between the control valve and the fluid sump of the power unit. Both of these valves are moveable between open and closed positions, and the solenoid valve has an operating coil which can be energized from a suitable source such as battery 38. A switch 39 controls the energization of the coil, and can be located remotely of the remainder of the apparatus, if desired.

A pressure gauge 41 is provided for indicating the pressure of the fluid in chamber 14. The fluid should preferably be one which does not change appreciably in viscosity or density with changes in temperature. One suitable fluid is a mixture of glycol and water.

The apparatus can be constructed as a portable test instrument, or it can be permanently installed with a line break control, if desired. In a portable instrument, hydraulic power unit 31 can be a hand-operated pump, and solenoid-operated valve 37 can be eliminated. In a permanent installation, gas for chamber 11 can be taken from the line, and power unit 31 can be a pump driven by either an electric motor or a gas motor.

Operation and use of the apparatus and therein the method of the invention can now be described. Let it be assumed that valve 17 has been connected to the sensing element of a line break control by suitable means such as a flexible hose. If the break control is to be calibrated or tested in place on a pipeline, the sensing element should be disconnected from the line.

With valves 36 and 37 closed, hydraulic power unit 31 is actuated to deliver fluid under pressure through check valves 33 and 32a to fluid chamber 14, forcing piston 13 against sleeve 16 and setting chamber 11 to its predetermined initial volume. The pressure in chamber 14 is made high enough that the piston will remain against the sleeve when chamber 11 is pressurized.

With valve 17 open and valve 26 closed, valve 23 is opened to supply gas from tank 21 to chamber 11. When the desired initial pressure is reached, as indicated by gauge 27, valve 23 is closed. If necessary, valve 26 can be opened briefly to bleed gas from the chamber to adjust the initial pressure. The initial pressure will generally be selected to correspond to the normal pressure in the pipeline with which the break control is to be used, and may, for example, be a pressure within a range of from 300 to 1,500 psi.

Flow control valve 32 is set to provide the desired rate of flow, and thereafter either valve 36 or valve 37 is opened. With either of these valves open, fluid discharges from chamber 14 at a substantially constant rate determined by the flow control valve orifice 32a setting. Piston 13 remains against the sleeve as long as the pressure in chamber 14 is high enough to hold it there. Thereafter, the piston moves away from the sleeve, the volume of chamber 11 increases, and the pressure of the gas decreases at a predetermined and substantially constant rate. Thus, a gas signal which decreases in pressure at a predetermined rate is delivered to sensing element 10 for calibrating or testing the break control as desired. At the end of the test, valve 36 or 37 is closed.

For a given initial volume of chamber 11 and a given initial pressure in this chamber, the rate at which the pressure of the gas drops is determined by the setting of flow control valve 32. The initial volume of chamber 11 is fixed by sleeve 16, and a simple table can be prepared for correlating the rate of drop with different initial pressures and the readings of a dial on valve 32. If desired, this valve can be provided with a dial which is calibrated directly in units of rate of drop for one or more predetermined initial gas pressures.

The maximum time for which the invention will deliver a gas pressure signal which decreases at a substantially constant rate is dependent upon the initial size of hydraulic chamber 14, the rate at which fluid is discharged from this chamber, and hence the rate at which the gas pressure decreases. With a chamber having an initial volume on the order of 1 cubic foot, a substantially constant gas pressure decrease on the order of 10 psi per minute can be maintained for a period on the order of 90 seconds.

The invention has a number of important features and advantages. It provides more accurate control and a smoother rate of drop than is possible with the techniques of the prior art. No gas is discharged to the atmosphere other than the small amount which may be bled from chamber 11 to establish the initial gas pressure. Moreover, it substantially reduces the time required for calibrating and/or testing a line break control.

It is apparent from the foregoing that a new and improved method and apparatus for generating a pressure signal for calibrating line break controls and other pressure-responsive apparatus has been provided. While only the presently-preferred embodiments have been described herein, as will be apparent to those familiar with the art, certain changes and modifications can be made without departing from the scope of the invention as defined by the following claims.

I claim:

1. In a method for calibrating and/or testing a line break control having means including a sensing element for monitoring the pressure of gas in a pipeline and interrupting the flow of gas in the event that the pressure in the line drops at a predetermined rate, the method utilizing a cylinder having a freely moveable fluid pressure operated member therein, said member dividing the cylinder into first and second closed chambers of variable volume and forming one wall of each chamber; said method comprising the steps of connecting the sensing element of the break control in fluid communication with the first chamber of variable volume, supplying liquid under pressure to the second chamber to move the moveable member to a predetermined limiting position in which the first chamber has a predetermined volume, introducing gas into the first chamber and establishing a predetermined initial pressure therein, said initial pressure being less than the pressure of the liquid whereby the moveable member is held in the limiting position by the liquid, and decreasing the pressure of the liquid in the second chamber by effecting a controlled discharge of liquid from the chamber at a predetermined constant rate whereby the gas in the first chamber moves the moveable member away from the limiting position, thereby increasing the volume of the first chamber and decreasing the pressure of the gas in said first chamber at a predetermined rate.

2. In a method for generating a gas signal which decreases in pressure at a predetermined rate, the method utilizing a closed chamber having hydraulically operated means for decreasing the volume of the chamber, the steps of decreasing the volume of the chamber to a predetermined initial volume by supplying liquid under pressure to the hydraulically operated means, introducing gas into the chamber and establishing a predetermined initial pressure therein, said initial pressure being sufficiently low relative to the pressure of the liquid that the hydraulically operated means maintains the chamber at the initial volume, and decreasing the pressure of the liquid by effecting a discharge of the liquid from the hydraulically operated means at a predetermined constant rate whereby the pressure of the gas overcomes the hydraulically operated means, thereby increasing the volume of the chamber and decreasing the pressure of the gas at a substantially constant rate.

3. In apparatus for calibrating and/or testing a line break control having means including a sensing element for monitoring the pressure of gas in a pipeline and interrupting the flow of gas in the event that the pressure in the line drops in a predetermined manner; the apparatus comprising means defining a chamber adapted to be connected in communication with the sensing element of the break control, a moveable member forming one wall of the chamber, hydraulically operated means for moving the member in one direction to decrease the volume of the chamber, means for limiting the movement of the member in said one direction whereby the chamber has a predetermined minimum volume, means for supplying liquid under pressure to the hydraulically operated means to decrease the volume of the chamber and maintain it at the predetermined minimum, means for introducing gas into the chamber and establishing a predetermined initial pressure therein when the volume of the chamber is at the predetermined minimum, and means for effecting discharge of liquid from the hydraulically operated means at a predetermined constant rate to enable the gas acting on the member to increase the volume of the chamber from the predetermined minimum whereby the pressure of the gas decreases from the initial pressure at a substantially constant rate.

4. Apparatus as in claim 3 wherein the means for effecting discharge of fluid is adjustable for selecting the rate at which the fluid is discharged.

5. Apparatus as in claim 3 wherein the means defining a chamber includes a cylinder and the moveable member comprises a fluid pressure operated piston mounted in the cylinder.

6. Apparatus as in claim 3 together with valve moveable between open and closed positions for controlling the discharge of liquid.

7. Apparatus as in claim 6 wherein the valve is an electrically operated valve.

8. In test apparatus for producing a predetermined rate of gas pressure drop, means forming a first closed chamber for receiving gas under pressure, means for introducing gas into the first chamber at an initial pressure, said first chamber including a freely moveable member forming one wall of the same, one side of the member presenting a predetermined fluid pressure area to gas in the first chamber, means forming a second closed chamber on the opposite side of said member, means for introducing liquid under pressure into the second chamber, said member being freely moveable under the urge of gas pressure alone from one limiting position responsive to a reduction in the quantity of liquid in the second chamber, introduction of liquid into the second chamber serving to move said member to its said limiting position, and flow control means for effecting controlled removal of liquid from the second chamber whereby the gas pressure in the first chamber is reduced from an initial to a lower value at a predetermined rate.

* * * * *